(12) United States Patent
Dong et al.

(10) Patent No.: US 10,534,139 B2
(45) Date of Patent: Jan. 14, 2020

(54) OPTICAL FIBER CONNECTOR ASSEMBLY

(71) Applicant: CommScope Telecommunications (Shanghai) Co., Ltd., Shanghai (CN)

(72) Inventors: Min Dong, Shanghai (CN); Zhaohui Cai, Shanghai (CN)

(73) Assignee: COMMSCOPE TELECOMMUNICATIONS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 15/739,030

(22) PCT Filed: Jun. 23, 2016

(86) PCT No.: PCT/CN2016/086847
§ 371 (c)(1),
(2) Date: May 10, 2018

(87) PCT Pub. No.: WO2016/206594
PCT Pub. Date: Dec. 29, 2016

(65) Prior Publication Data
US 2018/0246282 A1 Aug. 30, 2018

(30) Foreign Application Priority Data

Jun. 23, 2015 (CN) .......................... 2015 1 0350553
Jun. 23, 2015 (CN) ...................... 2015 2 0434158 U

(51) Int. Cl.
*G02B 6/38* (2006.01)
*G02B 6/44* (2006.01)

(52) U.S. Cl.
CPC ......... *G02B 6/3825* (2013.01); *G02B 6/3847* (2013.01); *G02B 6/3857* (2013.01);
(Continued)

(58) Field of Classification Search
None
See application file for complete search history.

(56) References Cited

U.S. PATENT DOCUMENTS 4,518,220 A 5/1985 Swanson
4,953,941 A * 9/1990 Takahashi ............ G02B 6/3831
385/72

(Continued)

FOREIGN PATENT DOCUMENTS

CN 102928922 A 2/2013
CN 103502860 A 1/2014

(Continued)

OTHER PUBLICATIONS

International Search Report and Written Opinion of the International Searching Authority for corresponding International Patent Application No. PCT/CN2016/086847 dated Sep. 29, 2016, 11 pages.

(Continued)

*Primary Examiner* — Rhonda S Peace
(74) *Attorney, Agent, or Firm* — Merchant & Gould P.C.

(57) ABSTRACT

This invention reveals a type of optical fiber connector assembly, comprising of a shell, an optical fiber adapter, an optical fiber connector and optical cable. The optical cable is provided with an optical cable securing device, an optical cable strengthening component being secured to the optical cable securing device, and the optical fiber within the optical cable passes through the optical cable securing device. The optical fiber connector assembly also comprises a first port end cap; the optical cable securing device is separate from the optical fiber connector, and fits within the accommodating cavity therein; the outer end of the end cap possesses an arrestor wall, which prevents the optical cable securing device from being pulled out of the accommodating cavity within the end cap; additionally there is a compressed spring (Continued)

provided between the end cap and the optical fiber adapter, the compressed spring being squeezed between the end surface of the end cap and the end surface of the optical fiber adapter. In this invention, since there is only a compressed spring provided on one side of the optical fiber adapter, the compressed spring being squeezed between the end cap and the end surface of the optical fiber adapter, the overall axial and radial size of the optical fiber connector assembly is reduced.

20 Claims, 2 Drawing Sheets

(52) U.S. Cl.
CPC ......... *G02B 6/3874* (2013.01); *G02B 6/4429* (2013.01); *G02B 6/4463* (2013.01); *G02B 6/4471* (2013.01)

(56) References Cited

U.S. PATENT DOCUMENTS

| | | | |
|---|---|---|---|
| 4,964,688 A | 10/1990 | Caldwell et al. | |
| 5,134,677 A | 7/1992 | Leung et al. | |
| 5,581,644 A | 12/1996 | Saito et al. | |
| 6,422,764 B1 | 7/2002 | Marrs et al. | |
| 6,579,014 B2 * | 6/2003 | Melton | G02B 6/3825 385/55 |
| 6,899,467 B2 | 5/2005 | McDonald et al. | |
| 6,962,445 B2 | 11/2005 | Zimmel et al. | |
| 7,044,650 B1 * | 5/2006 | Tran | G02B 6/3874 385/54 |
| 7,113,679 B2 | 9/2006 | Melton et al. | |
| 7,114,855 B2 * | 10/2006 | Wittrisch | G02B 6/3825 385/55 |
| 7,438,479 B2 * | 10/2008 | Mitamura | G02B 6/3846 385/78 |
| 7,572,065 B2 | 8/2009 | Lu et al. | |
| 7,654,747 B2 | 2/2010 | Theuerkom et al. | |
| 7,686,519 B2 | 3/2010 | Lu | |
| 7,744,288 B2 | 6/2010 | Lu et al. | |
| 7,785,016 B2 | 8/2010 | Luther et al. | |
| 7,985,027 B2 | 7/2011 | Lewallen et al. | |
| 8,376,628 B2 | 2/2013 | Koreeda et al. | |
| 8,515,233 B2 | 8/2013 | Dominique | |
| 8,676,022 B2 | 3/2014 | Jones | |
| 2001/0007641 A1 | 7/2001 | Jovanovich et al. | |
| 2001/0012428 A1 | 8/2001 | Nakajima et al. | |
| 2006/0193562 A1 | 8/2006 | Theuerkom | |
| 2008/0310796 A1 | 12/2008 | Lu | |
| 2009/0238520 A1 | 9/2009 | Wouters | |
| 2013/0022317 A1 * | 1/2013 | Norris | G02B 6/3865 385/78 |
| 2014/0064671 A1 | 3/2014 | Barnette, Jr. et al. | |
| 2014/0241670 A1 | 8/2014 | Barnette, Jr. et al. | |
| 2017/0139158 A1 * | 5/2017 | Coenegracht | G02B 6/3825 |
| 2017/0235060 A1 * | 8/2017 | Coenegracht | G02B 6/3825 385/60 |
| 2017/0261696 A1 * | 9/2017 | Compton | G02B 6/3821 |
| 2017/0261698 A1 * | 9/2017 | Compton | G02B 6/3821 |
| 2017/0261699 A1 * | 9/2017 | Compton | G02B 6/3821 |
| 2018/0246282 A1 * | 8/2018 | Dong | G02B 6/38 |
| 2018/0252875 A1 * | 9/2018 | Pimpinella | G02B 6/3894 |

FOREIGN PATENT DOCUMENTS

| | | |
|---|---|---|
| CN | 205038371 U | 2/2016 |
| GB | 2 201 009 A | 8/1988 |
| JP | S52-72240 A | 6/1977 |
| JP | S57-29023 A | 2/1982 |
| JP | S57-72240 A | 5/1982 |
| JP | S60-6909 A | 1/1985 |
| JP | 2000-28859 A | 1/2000 |
| JP | 2013-160880 A | 8/2013 |
| WO | 2014/123940 A1 | 8/2014 |
| WO | 2014/167447 A1 | 10/2014 |
| WO | 2014/197894 A1 | 12/2014 |
| WO | 2015/197588 A1 | 12/2015 |

OTHER PUBLICATIONS

Extended European Search Report for corresponding European Patent Application No. 16813710.7 dated Jan. 24, 2019, 8 pages.

* cited by examiner

OPTICAL FIBER CONNECTOR ASSEMBLY

This application is a National Stage Application of PCT/CN2016/086847, filed on 23 Jun. 2016, which claims the benefit of Chinese patent application 201510350553.4, filed on 23 Jun. 2015 and claims the benefit of Chinese patent application 201520434158.X, filed on 23 Jun. 2015 the disclosures of which are hereby incorporated by reference in their entireties. To the extent appropriate, a claim of priority is made to each of the above disclosed applications.

TECHNICAL FIELD

This invention relates to a type of optical fibre connector assembly.

PRIOR ART

The optical fibres of pairs of optical cables are generally butt-joined using an optical fibre connector and an optical fibre adapter. In the prior art, the optical fibres within optical cables are secured within the internal aperture of the optical fibre connector ferrule using glue, and optical cable strengthening components are crimped onto the shell of the optical fibre connector, in order to prevent external tension placed on the optical cable being transmitted to the optical fibre.

In the prior art, where such optical fibre connector assemblies consisting of an optical fibre adapter and an optical fibre connector are concerned, usually a compressed spring is installed on both sides of the optical fibre adapter, the compressed spring generally being in a sleeved arrangement on the shell of the optical fibre connector. This results in the optical fibre connector assembly being fairly large in both the axial and radial directions.

INVENTION CONTENT

The aim of this invention is to resolve at least one aspect of the above mentioned problems and drawbacks encountered with current technology.

One aim of this invention is to provide an optical fibre connector assembly, whereby the overall size of the optical fibre connector assembly is reduced.

According to one aspect of this invention, it provides a type of optical fibre connector assembly, which consists of: a shell, which possesses a first port and a second port opposite said first port; an optical fibre adapter, which is installed by insertion into said shell; an optical fibre connector, installed on said optical fibre adapter and accommodated within said shell; and an optical cable, the optical fibre of which is secured within said optical fibre connector ferrule. Said optical cable is provided with an optical cable securing device, the cable strengthening component of said optical cable is secured to the optical cable securing device, and the optical fibre within the optical cable passes through the optical cable securing device. The optical fibre connector assembly also comprises a first port end cap secured to the first port of said shell; said optical cable securing device is separate from said optical fibre connector, and is accommodated within the accommodating cavity within said end cap; the outer end of the end cap possesses an arrestor wall, which prevents the optical cable securing device from being pulled out of the accommodating cavity within the end cap; additionally, there is a compressed spring provided between said end cap and said optical fibre adapter, said compressed spring being squeezed between the end surface of said end cap and the end surface of said optical fibre adapter.

According to one illustrative embodiment of this invention, the distance between the ferrules of said optical fibre securing device and said optical fibre connector is pre-set in the axial direction of said optical cable; additionally the part of the optical fibre of said optical cable located between said optical cable securing device and said ferrule is located within the accommodating cavity of said end cap, in a manner that allows said optical fibre to bend within said accommodating cavity.

According to another illustrative embodiment of this invention, said optical cable is a round optical cable which possesses Kevlar fibre; and said optical cable securing device comprises: a supporting body, which possesses an axial internal aperture facilitating the passage of said optical fibre; and a crimping ring, for the purpose of crimping said Kevlar fibre onto said supporting body.

According to another illustrative embodiment of this invention, said supporting body consists of a pair of separate supporting half-bodies, said pair of separate supporting half-bodies being such that they may be assembled into a single complete supporting body.

According to another illustrative embodiment of this invention, said optical cable is a ribbon type optical cable possessing glass fibre strengthening ribs; and said optical cable securing device comprises: a supporting body, which possesses an axial internal aperture facilitating the passage of said optical fibre and accommodating the glass fibre strengthening ribs glue injection hole; and a crimping ring, crimped onto said supporting body, whereby, injection of glue into said glue injection hole allows the glass fibre strengthening ribs of said optical cable to be secured to said supporting body.

According to another illustrative embodiment of this invention, said supporting body consists of a pair of separate supporting half-bodies, said pair of separate supporting half-bodies being such that they may be assembled into a single complete supporting body.

According to another illustrative embodiment of this invention, said end cap is secured within the first port of said shell in a clip-on fashion.

According to another illustrative embodiment of this invention, a plurality of notches are formed on the peripheral wall of the shell close to said first port; a plurality of elastic arms are formed on said end cap, and additionally there is a raised section formed on the end of each elastic arm; additionally, when said end cap is installed on the first port of said shell, the raised sections on the end cap clip into corresponding notches on the inside of said shell.

According to another illustrative embodiment of this invention, there is at least one ring-shaped sealing ring located between the external wall of said end cap and the internal wall of said shell, acting by sealing the interface between the external wall of said end cap and the internal wall of said shell.

According to another illustrative embodiment of this invention, there is at least one ring shaped recessed slot formed on the external wall of said end cap, said ring shaped sealing ring being located in said recessed slot.

According to another illustrative embodiment of this invention, said optical fibre connector assembly also comprises a dust cap, said dust cap fitting in a sleeved arrangement onto the external end wall of the first port of said shell for the purpose of covering the first port of said shell in addition to said notches.

According to another illustrative embodiment of this invention, a plurality of supporting arms are formed on said dust cap; when the dust cap is installed on the first port of said shell, the supporting arms of said dust cap are inserted between the elastic arms of said end cap and the external wall of said end cap, being for the purpose of preventing the separation of the raised sections on the elastic arms of said end cap from the notches on said shell.

According to another illustrative embodiment of this invention, the optical fibre connector assembly also comprises a sealing cap, said sealing cap being installed in a sealed arrangement on the second port of said shell, being for the purpose of sealing the second port of said shell.

According to another embodiment of this invention, there is an external thread formed on said sealing cap, and additionally there is an internal thread formed on the internal wall of the second port of said shell, the thread of said sealing cap connecting with the second port of said shell.

According to another embodiment of this invention, said optical fibre adapter comprises a shell, a butt-joining retention module accommodated within the shell and an alignment sleeve accommodated within an accommodating aperture within said butt-joining retention module; the ferrule of said optical fibre connector is inserted into said alignment sleeve from one end of said alignment sleeve, allowing alignment of the optical fibre within said ferrule with the optical fibre within the ferrule of another optical fibre connector inserted into said alignment sleeve from the other end; said butt-joining retention module possesses a pair of elastic catches, the pair of elastic catches being such that they may be clipped into recessed slots on the shell of said optical fibre connector.

According to another embodiment of this invention, said optical fibre adapter also comprises a securing clip component, said securing clip component being installed by insertion into an insertion slot on the shell of said optical fibre adapter, catching onto the cylindrical body of the butt-joining retention module, thus preventing said butt-joining retention module from being pulled out of the shell of said optical fibre adapter.

According to another embodiment of this invention, said optical fibre connector assembly also comprises of heat shrink tubing, one end of said heat shrink tubing being heat-shrunk onto the external end wall of said end cap, the other end of said heat shrink tubing being heat shrunk onto said optical cable.

According to another embodiment of this invention, said optical fibre connector also includes a strain relief boot, said strain relief boot being in a sleeved arrangement on said heat shrink tubing.

In each of the above mentioned illustrative embodiments of this invention, the compressed spring is only provided on one side of the optical fibre adapter, said compressed spring being squeezed between the end surfaces of the end cap and the optical fibre adapter, not being in a sleeved arrangement on the optical fibre connector, the result of this is a reduction of the overall axial and radial size of the optical fibre connector assembly.

The descriptions of this invention in the following text taken in conjunction with the appended diagrams clarify the various aims and advantages of this invention, and are of assistance in gaining a full understanding of this invention.

APPENDED DRAWINGS DESCRIPTION

DETAILED EMBODIMENTS

The following embodiments, taken in conjunction with the appended diagrams, provide a more detailed description of the technical schemes of this invention. Within the description, numbering that is the same or similar occurring in the appended drawings refers to components that are the same or similar.

The aim of the following description of the modes of embodiment of this invention taken in conjunction with the appended drawings are to aid in interpretation of the overall conceptual framework of this invention, and should not be understood as restricting this invention in any way.

An overall technical conceptualization, according to this invention, is that it provides a type of optical fibre connector assembly, comprising: a shell, which possesses a first port and a second port opposite said first port; an optical fibre adapter, which is installed by insertion into said shell; an optical fibre connector, installed on said optical fibre adapter and accommodated within said shell; and optical cable, the optical fibre of which is secured within said optical fibre connector ferrule. Said optical cable is provided with an optical cable securing device, the cable strengthening component of said optical cable being secured to the optical cable securing device, and the optical fibre within the optical cable passes through the optical cable securing device. The optical fibre connector assembly also comprises a first port end cap secured to the first port of said shell; said optical cable securing device is separate from said optical fibre connector, and is accommodated within the accommodating cavity within said end cap; the outer end of the end cap possesses an arrestor wall, which prevents the optical cable securing device from being pulled out of the accommodating cavity within the end cap; additionally, there is a compressed spring furnished between said end cap and said optical fibre adapter, said compressed spring is squeezed between the end surface of said end cap and the end surface of said optical fibre adapter.

Figure 1:
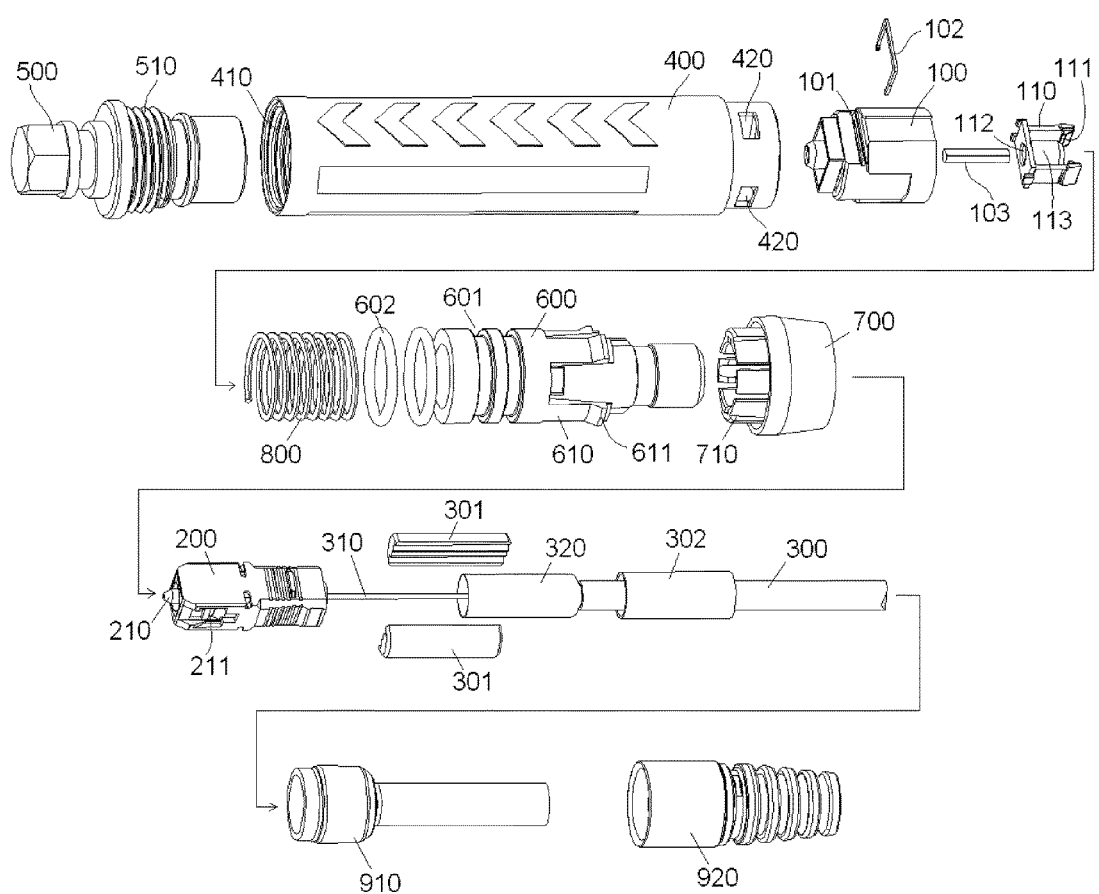
FIG. 1 is a segmented graphical representation of an illustrative embodiment of the optical fibre connector assembly according to this invention.
Figure 2:
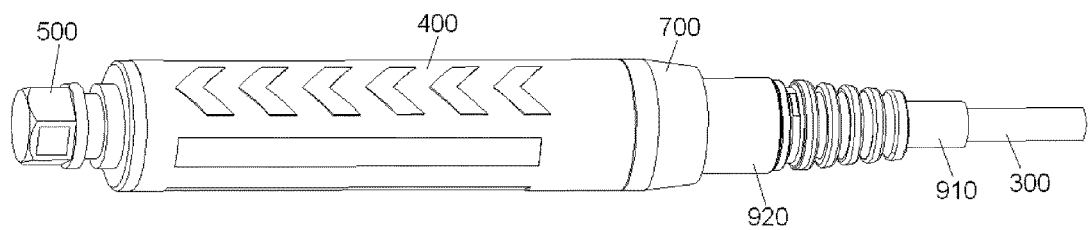
FIG. 2 is an assembled representation of an illustrative embodiment of the optical fibre connector assembly according to this invention.

FIG. 1 is a segmented graphical representation of an illustrative embodiment of the optical fibre connector assembly according to this invention; FIG. 2 is an assembled representation of an illustrative embodiment of the optical fibre connector assembly according to this invention; and FIG. 3 is a cut-away representation of the optical fibre connector assembly shown in FIG. 2.

One illustrative embodiment of this invention revealed a type of optical fibre connector assembly. As shown in FIG. 1 to FIG. 3; in the embodiment shown, said optical fibre connector assembly mainly comprises of a shell 400, an optical fibre connector 100, an optical fibre connector 200 and optical cable 300.

In the embodiment clearly and graphically represented in FIG. 1, the shell 400 possesses a first port (the right hand end in the drawing) and a second port opposing the first port (the left hand end of the drawing). As shown in FIG. 1 and FIG. 3, the optical fibre connector 200 is such that it may be installed on the optical fibre adapter 100, and additionally the optical fibre connector 200 and optical fibre adapter 100 having been assembled together are such that they may be installed within the shell 400 by insertion into the first port of the shell 400. The exposed optical fibre 310 of the optical cable 300 is secured within the internal aperture within the ferrule 210 of the optical fibre connector 200 using glue.

Figure 3:
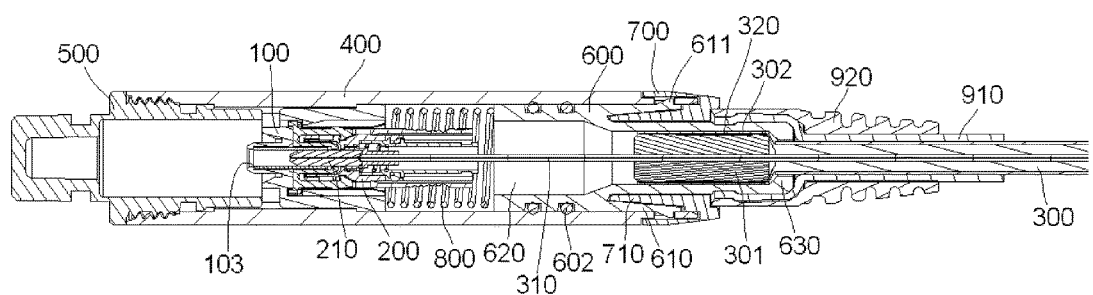
FIG. 3 is a cut-away representation of the optical fibre connector assembly shown in FIG. 2.

In one embodiment of this invention, as shown in FIG. 1 and FIG. 3, the optical cable 300 is provided with an optical cable securing devices 301 and 302, the cable strengthening component 320 of the optical cable 300 being secured to the optical cable securing devices 301 and 302, the optical fibre 310 within the optical cable 300 passing through the optical cable securing devices 301 and 302.

As shown in FIG. 1 and FIG. 3, the optical fibre connector assembly also comprises an end cap 600 secured within the first port of the shell 400. The optical cable securing devices 301 and 302 is separate from the optical fibre connector 200, and is accommodated within the accommodating cavity 620 within the end cap 600. There is an arrestor wall 630 formed on the external end of the end cap 600, for the purpose of preventing the optical cable securing devices 301 and 302 from being pulled out of the accommodating cavity 620 within the end cap 600. In this manner, when tension is exerted externally on the optical cable 300, the optical cable securing devices 301 and 302 is obstructed by the arrestor wall 630 of the end cap 600, preventing further movement towards the exterior, thus preventing the optical cable securing devices 301 and 302 from being pulled out of the accommodating cavity 620 within the end cap 600. At the same time, external tension exerted on the optical cable 300 is transmitted to the end cap 600 via the optical cable securing devices 301 and 302, and then transmitted to the shell 400 by said end cap 600, rather than being transmitted to the optical fibre 310, therefore effectively preventing the optical fibre 310 from being affected by external tension.

As shown in FIG. 1 and FIG. 3, in the embodiment shown, there is a compressed spring 800 provided between the end cap 600 and the optical fibre adapter 100, said compressed spring 800 being squeezed between the end surface of said end cap 600 and the end surface of said optical fibre adapter 100.

As shown in FIG. 1 and FIG. 3, the distance in the axial direction on the optical cable 300 between the optical cable securing devices 301 and 302 and the ferrules 210 of the optical fibre connector 200 is pre-set; the part of the optical fibre 310 of the optical cable 300 located between the optical cable securing devices 301 and 302 and the ferrule 210 is located within the accommodating cavity 620 of the end cap 600, in a manner that allows the optical fibre 310 to bend within the accommodating cavity 620, thus ensuring the effectiveness of the optical fibre 310 butt-joint.

According to the embodiment depicted in the drawings, as shown in FIG. 1 and FIG. 3, the optical cable 300 is a round optical cable which possesses Kevlar fibre 320; and additionally the optical cable securing devices 301 and 302 comprises a supporting body 301 and crimping ring 302. As shown in FIG. 1 and FIG. 3, the supporting body 301 possesses an axial internal aperture facilitating the passage of said optical fibre 310. The crimping ring 302 being for the purpose of crimping said Kevlar fibre 320 onto said supporting body 301. In the embodiment shown, the supporting body 301 consists of a pair of separate supporting half-bodies 301 and 301, this pair of separate supporting half-bodies 301 and 301 being such that they may be assembled into a single complete supporting body, this allowing convenient crimping.

Please note that this invention is not restricted to the embodiment graphically represented here, and the optical cable may be of a ribbon type with glass fibre strengthening ribs. If this is the case, the optical cable securing device supporting body possesses an axial internal aperture facilitating the passage of the optical fibre and accommodating the glass fibre strengthening ribs glue injection hole. Injection of glue into the glue injection hole allows the glass fibre strengthening ribs of said ribbon type optical cable to be secured to the supporting body. Apart from this, the crimping ring is crimped directly onto the supporting body. In this manner, the glass fibre strengthening ribs of said ribbon type optical cable can be firmly secured to the supporting body.

As shown in FIG. 1 and FIG. 3, in the embodiment shown, the end 600 cap is secured within the first port of the shell 400 in a clip-on fashion. A plurality of notches 420 are formed on the peripheral wall of the shell 400 close to the first port. A plurality of elastic arms 610 are formed on said end cap 600, in addition to which there is a raised section 611 formed on the end of each elastic arm 610. In this manner, as shown in FIG. 1 and FIG. 3, when the end cap 600 is installed on the first port of the shell 400, the raised sections 611 on the end cap 600 clip into corresponding notches 420 on the inside of the shell 400.

As shown in FIG. 1 and FIG. 3, in the embodiment shown, there is at least one ring-shaped sealing ring 602 located between the external wall of the end cap 600 and the internal wall of the shell 400, acting by sealing the interface between the external wall of the end cap 600 and the internal wall of the shell 400. As shown in FIG. 1 and FIG. 3, there is at least one ring shaped recessed slot 601 formed on the external wall of the end cap 600, the ring shaped sealing ring 602 being located in the recessed slot 601.

According to the embodiment depicted, as shown in FIG. 1 and FIG. 3, two ring shaped sealing rings 602 are provided, however, this invention is not restricted by the embodiment graphically represented here, and one or three or more ring-shaped sealing rings 602 may be provided.

As shown in FIG. 1 to FIG. 3, according to an embodiment of this invention, this optical fibre connector assembly also comprises a dust cap 700, said dust cap 700 fitting in a sleeved arrangement onto the external end wall of the first port of said shell 400, being for the purpose of covering the first port of said shell 400 in addition to said notches 420.

As shown in FIG. 1 and FIG. 3, in the embodiment shown, a plurality of supporting arms 710 are formed on the dust cap 700. In this manner, when the dust cap 700 is installed in the first port of the shell 400, the supporting arms 710 of the dust cap 700 are inserted between the elastic arms 610 of the end cap 600 and the external wall of the end cap 600, being for the purpose of preventing the elastic arms 610 of the end cap 600 from moving in the direction away from the notches 420, thus effectively preventing the raised sections 611 on the elastic arms 610 of the end cap 600 from separating from the notches 420 on the shell 400.

As is shown in FIG. 3, according to an embodiment of this invention, the optical fibre connector assembly also comprises a sealing cap 500, said sealing cap 500 being installed in a sealed arrangement on the second port of the shell 400, being for the purpose of sealing the second port of the shell 400, to prevent ingress of external dust or contaminants.

When it is necessary to butt-join the optical fibre connector 200 with another optical fibre connector (not shown), said sealing cap 500 is first removed from the shell 400, then another optical fibre connector is inserted via the second port of the shell, allowing the butt-joining of another optical fibre connector with said optical fibre connector 200.

According to the embodiment graphically represented, as shown in FIG. 1 and FIG. 3, there is an external thread 510 formed on the sealing cap 500, and additionally there is an internal thread 410 formed on the internal wall of the second port of said shell 400, the thread of said sealing cap 500 connecting with the second port of the shell 400. In a similar manner, there is an external thread formed on the shell of the other optical fibre connector corresponding to the external thread 510 on the sealing cap 500, allowing the threaded connection with the second port of the shell 400.

As shown in FIG. 1 and FIG. 3, in the embodiment shown, the optical fibre adapter 100 comprises a shell, a butt-joining retention module 110 accommodated within the shell and an alignment sleeve 103 accommodated within an accommodating aperture 112 within said butt-joining retention module 110. The ferrule 210 of the optical fibre connector 200 is inserted into the alignment sleeve 103 from one end of the alignment sleeve 103, allowing alignment of the optical fibre within said ferrule 210 with the optical fibre inserted into said alignment sleeve 103 from the other end of said alignment sleeve 103 within the ferrule of the other optical fibre connector.

As shown in FIG. 1 and FIG. 3, the butt-joining retention module 110 possesses a pair of elastic catches 111, the pair of elastic catches 111 being such that they are suited to clipping into recessed slots 211 on the shell of said optical fibre connector 200. As shown in FIG. 1 and FIG. 3, the optical fibre adapter also comprises a securing clip component 102, said securing clip component 102 being installed by insertion into an insertion slot 101 on the shell of the optical fibre adapter 100, catching onto the cylindrical body 113 of the butt-joining retention module 110, thus preventing said butt-joining retention module 110 from being pulled out of the shell of the optical fibre adapter 100.

As shown in FIG. 1 to FIG. 3, in the embodiment shown, said optical fibre connector assembly also comprises of heat shrink tubing 910, one end of said heat shrink tubing 910 being heat-shrunk onto the external end wall of the end cap 600, the other end being heat shrunk onto said optical cable 300, thus sealing the interface between the end cap 600 and the optical cable 300.

As shown in FIG. 1 to FIG. 3, in the embodiment shown, the aforementioned optical fibre connector also includes a strain relief boot 920, the front end of said strain relief boot 920 being in a sleeved arrangement on the aforementioned heat shrink tubing 910, in order to prevent damage occurring to the optical cable 300 due to the effects of lateral tension.

Regardless of the fact that this invention has been described in conjunction with the appended diagrams, the aim of the embodiments to which the appended diagrams relate is purely to provide illustrative descriptions of preferred embodiments of this invention, and should not be understood as constituting any kind of restriction on this invention.

Regardless of the fact that certain embodiments representative of the overall concepts of this invention have been displayed and described, an average technician in this field would be able to make various modifications to these embodiments without departing from the principles and spirit embodied by the concepts of this invention, and as long as these do not conflict with the structures or principles described in these embodiments they may be freely assembled, the scope of this invention being defined by the claims and their equivalents.

It should be understood that, the wording "including" does not exclude other components or steps, and the wording "an" or "one" does not exclude more than one. Apart from this, the labelling of any component in the claims should not be understood as restricting the scope of this invention in any way.

The invention claimed is:

1. An optical fibre connector assembly, comprising:
   a shell, which possesses a first port and a second port opposite said first port;
   an optical fibre adapter, which is installed by insertion into said shell;
   an optical fibre connector, installed on said optical fibre adapter and accommodated within said shell; and
   an optical cable having an optical fibre and a strengthening component, the optical fibre being secured within a ferrule of said optical fibre connector,
   whereby, said optical cable is provided with an optical cable securing device, the strengthening component of said optical cable being secured to said optical cable securing device, and additionally, the optical fibre of said optical cable passes through said optical cable securing device,
   wherein:
   the optical fibre connector assembly also comprises a first port end cap secured to the first port of said shell;
   said optical cable securing device is separate from said optical fibre connector, and is accommodated within an accommodating cavity within said end cap;
   there is an arrestor wall formed on the external end of said end cap, for the purpose of preventing said optical cable securing device from being pulled out of the accommodating cavity within said end cap; and
   additionally there is a compressed spring provided between said end cap and said optical fibre adapter, said compressed spring being squeezed between the end surface of said end cap and the end surface of said optical fibre adapter.

2. The optical fibre connector assembly according to claim 1, wherein:
   said optical cable securing device and the ferrule of the optical fibre connector are at a pre-set distance from each other in the axial direction of said optical cable and additionally, part of the optical fibre of said optical cable located between said optical cable securing device and said ferrule is located within the accommodating cavity of said end cap, in a manner that allows said optical fibre-to bend within said accommodating cavity.

3. The optical fibre connector assembly according to claim 2, wherein:
   said supporting body consists of a pair of separate supporting half-bodies, said pair of separate supporting half-bodies being such that they may be assembled into a single complete supporting body.

4. The optical fibre connector assembly according to claim 1, wherein:
   said optical cable is a round optical cable which possesses Kevlar fibre; and said optical cable securing device comprises:
   a supporting body, which possesses an axial internal aperture facilitating the passage of said optical fibre; and
   a crimping ring, for the purpose of crimping said Kevlar fibre onto said supporting body.

5. The optical fibre connector assembly according to claim 1, wherein:
   said optical cable is a ribbon type optical cable possessing glass fibre strengthening ribs;

and additionally, said optical cable securing device comprises:
a supporting body, which possesses an axial internal aperture facilitating the passage of said optical fibre and accommodating the glass fibre strengthening ribs and a glue injection hole; and
a crimping ring, crimped onto said supporting body,
whereby, injection of glue into said glue injection hole allows the glass fibre strengthening ribs of said optical cable to be secured to said supporting body.

6. The optical fibre connector assembly according to claim 5, wherein:
said supporting body consists of a pair of separate supporting half-bodies, said pair of separate supporting half-bodies being such that they may be assembled into a single complete supporting body.

7. The optical fibre connector assembly according to claim 1, wherein:
said end cap is secured within the first port of said shell in a clip-on fashion.

8. The optical fibre connector assembly according to claim 7, wherein:
a plurality of notches are formed on a peripheral wall of the shell close to said first port;
a plurality of elastic arms are formed on said end cap, and additionally there is a raised section formed on the end of each elastic arm; and
when said end cap is installed on the first port of said shell, the raised sections on the end cap clip into corresponding notches on the inside of said shell.

9. The optical fibre connector assembly according to claim 8, wherein:
there is at least one ring-shaped sealing ring located between an external wall of said end cap and an internal wall of said shell, acting by sealing the interface between the external wall of said end cap and the internal wall of said shell.

10. The optical fibre connector assembly according to claim 9, wherein:
there is at least one ring shaped recessed slot formed on the external wall of said end cap, said ring shaped sealing ring being located in said recessed slot.

11. The optical fibre connector assembly according to claim 8, wherein:
said optical fibre connector assembly also comprises a dust cap, said dust cap fitting in a sleeved arrangement onto an external end wall of the first port of said shell, being for the purpose of covering the first port of said shell in addition to said notches.

12. The optical fibre connector assembly according to claim 11, wherein:
a plurality of supporting arms are formed on said dust cap; when the dust cap is installed on the first port of said shell, the supporting arms of said dust cap are inserted between the elastic arms of said end cap and an external wall of said end cap, being for the purpose of preventing the raised sections on the elastic arms of said end cap from separating from the notches on said shell.

13. The optical fibre connector assembly according to claim 12, wherein:
the optical fibre connector assembly also comprises a sealing cap, said sealing cap being installed in a sealed arrangement on the second port of said shell, being for the purpose of sealing the second port of said shell.

14. The optical fibre connector assembly according to claim 13, wherein:
there is an external thread formed on said sealing cap, and additionally there is an internal thread formed on an internal wall of the second port of said shell, the thread of said sealing cap connecting with the second port of said shell.

15. The optical fibre connector assembly according to claim 1, wherein:
said optical fibre adapter comprises a shell, a butt-joining retention module accommodated within the shell and an alignment sleeve accommodated within an accommodating aperture within said butt-joining retention module;
the ferrule of said optical fibre connector is inserted into said alignment sleeve from one end of said alignment sleeve, allowing alignment of the optical fibre within said ferrule with an optical fibre inserted into said alignment sleeve from the other end of said alignment sleeve within a ferrule of the another optical fibre connector; and additionally said butt-joining retention module possesses a pair of elastic catches, the pair of elastic catches being such that they are suited to clipping into recessed slots on the shell of one of said optical fibre connectors.

16. The optical fibre connector assembly according to claim 15, wherein:
said optical fibre adapter also comprises a securing clip component, said securing clip component being installed by insertion into an insertion slot on the shell of said optical fibre adapter, catching onto the cylindrical body of the butt-joining retention module, thus preventing said butt-joining retention module from being pulled out of the shell of said optical fibre adapter.

17. The optical fibre connector assembly according to claim 1, wherein:
said optical fibre connector assembly also comprises of heat shrink tubing, one end of said heat shrink tubing being heat-shrunk onto the arrestor wall of said end cap, the other end of said heat shrink tubing being heat shrunk onto said optical cable.

18. The optical fibre connector assembly according to claim 17, wherein:
the optical fibre connector also includes a strain relief boot, said strain relief boot being in a sleeved arrangement on said heat shrink tubing.

19. A fibre optic connector assembly, comprising:
a shell extending along a longitudinal axis from a first port of the shell to a second port of the shell opposite the first port;
an optical fibre adapter positioned in the shell;
an optical fibre connector positioned in the shell and installed on the optical fibre adapter;
an end cap secured to the first port of the shell and spaced apart from the adapter along the longitudinal axis; and
a spring provided between the end cap and the optical fibre adapter, the spring being contacted on one side by an end surface of the end cap and on an opposing side by an end surface of the optical fibre adapter.

20. A fibre optic connector assembly, comprising:
a shell having a first port and a second port opposite the first port;
an optical fibre adapter positioned in the shell;
an optical fibre connector positioned in the shell and installed on the optical fibre adapter;

an optical cable comprising an optical fibre and a strengthening component, the optical fibre being secured within a ferrule of the optical fibre connector;

an end cap secured to the first port of the shell; and an optical cable securing device, the strengthening component of the optical cable being secured to an outer surface of the optical cable securing device between the outer surface and the end cap, the optical fibre passing through the optical cable securing device;

wherein the optical cable securing device is separate from the optical fibre connector and is positioned within a cavity defined by the end cap; and wherein the end cap is adapted to prevent the optical cable securing device from being pulled out of the cavity.

* * * * *